US010427958B2

(12) United States Patent
Hunter et al.

(10) Patent No.: US 10,427,958 B2
(45) Date of Patent: Oct. 1, 2019

(54) CAPACITIVE DEIONIZATION CHARGE TRANSFER FROM ONE CAPACITOR SIMULTANEOUSLY TO MULTIPLE CAPACITORS

(71) Applicant: Lawrence Livermore National Security, LLC, Livermore, CA (US)

(72) Inventors: Steven L. Hunter, Livermore, CA (US); Michael Stadermann, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 192 days.

(21) Appl. No.: 15/352,058

(22) Filed: Nov. 15, 2016

(65) Prior Publication Data

US 2018/0134588 A1 May 17, 2018

(51) Int. Cl.
*C02F 1/469* (2006.01)
*C02F 101/16* (2006.01)
*C02F 101/20* (2006.01)

(52) U.S. Cl.
CPC ...... *C02F 1/4691* (2013.01); *C02F 2101/163* (2013.01); *C02F 2101/20* (2013.01); *C02F 2201/46125* (2013.01)

(58) Field of Classification Search
CPC ......... C02F 1/4691; C02F 2201/46125; C02D 2101/163; C02D 2101/20
See application file for complete search history.

(56) References Cited

U.S. PATENT DOCUMENTS

| | | | |
|---|---|---|---|
| 2003/0098266 A1 | 5/2003 | Shiue et al. | |
| 2004/0188246 A1 | 9/2004 | Tran et al. | |
| 2009/0045048 A1* | 2/2009 | Bourcier | C02F 1/4691 204/228.1 |
| 2013/0270116 A1* | 10/2013 | Hu | C02F 1/4691 204/661 |
| 2013/0342028 A1 | 12/2013 | Hermann et al. | |

(Continued)

FOREIGN PATENT DOCUMENTS

WO  2012125637 A2  9/2012

OTHER PUBLICATIONS

Pernia et al (IEEE Transactions on Power Electronics, vol. 27, No. 7, Jul. 2012 3257) (Year: 2012).*

(Continued)

*Primary Examiner* — Louis J Rufo
(74) *Attorney, Agent, or Firm* — Harness, Dickey & Pierce, PLC

(57) ABSTRACT

An energy transfer system is disclosed which has a controller, a first capacitor acting as a first electrode, a second capacitor acting as a second electrode, a first inductor for storing energy received from the first capacitor, and transferring the stored energy to the second capacitor, and a first plurality of electronic switches. The first plurality of electronic switches may be controlled by the controller to control a transfer of energy from the first capacitor to the first inductor, and from the first inductor to the first capacitor. An additional energy transfer subsystem may be included which has a second inductor for receiving energy from the first capacitor while the first inductor is transferring the stored energy to the second capacitor.

13 Claims, 3 Drawing Sheets

(56) References Cited

U.S. PATENT DOCUMENTS

2015/0166373 A1  6/2015  Landon et al.

OTHER PUBLICATIONS

Alkuran, Mohammad et al. "Highly Efficient Capacitive De-Ionization (CDI) Water Purification System Using a Buck-Boost Converter", IEEE, Sep. 8, 2008, pp. 1926-1930.
International Search Report and Written Opinion issued in International Application No. PCT/US2017/057349 dated Feb. 1, 2018, 12 pp.

* cited by examiner

CAPACITIVE DEIONIZATION CHARGE TRANSFER FROM ONE CAPACITOR SIMULTANEOUSLY TO MULTIPLE CAPACITORS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to a system and method for transferring energy from one capacitor simultaneously to two or more capacitors to significantly reduce the fraction of capacitors that are not charging. The systems and methods are specifically applied in this disclosure to deionization of a fluid containing ions, such as salt, which may contain other chemicals such as nitrates, heavy metals, scalant, etc., using capacitive deionization, where it will improve the economics of a capacitive deionization system.

BACKGROUND

This section provides background information related to the present disclosure which is not necessarily prior art.

There is a presently a strong interest in improving the economics of a capacitive deionization system which is used for water desalination. Water desalination is expected to continue growing in importance over the coming years as shortages of fresh water continue to be experienced in various regions around the world, and especially in those regions bordering bodies of salt water.

Capacitive deionization is one method of desalination which removes salt from salt water by using electric fields. However, due to finite charge capacity, the capacitors used in such systems, which act as electrodes, have to be charged and discharged in a continuous cycle of desalination and regeneration. This is done typically by transferring the charge between two capacitors, and only adding additional energy to the system as energy is resistively dissipated. In a typical capacitive deionization system, the desalination (removal of ions from the water) takes place when the capacitor is charging, and the regeneration (removal of salt from the capacitor) takes place when the electrode is discharging. While there are capacitive desalination systems in which the charge states are reversed, the charging step will be called the desalination step, and the discharging step will be called the regeneration step throughout this document.

Figure 1:
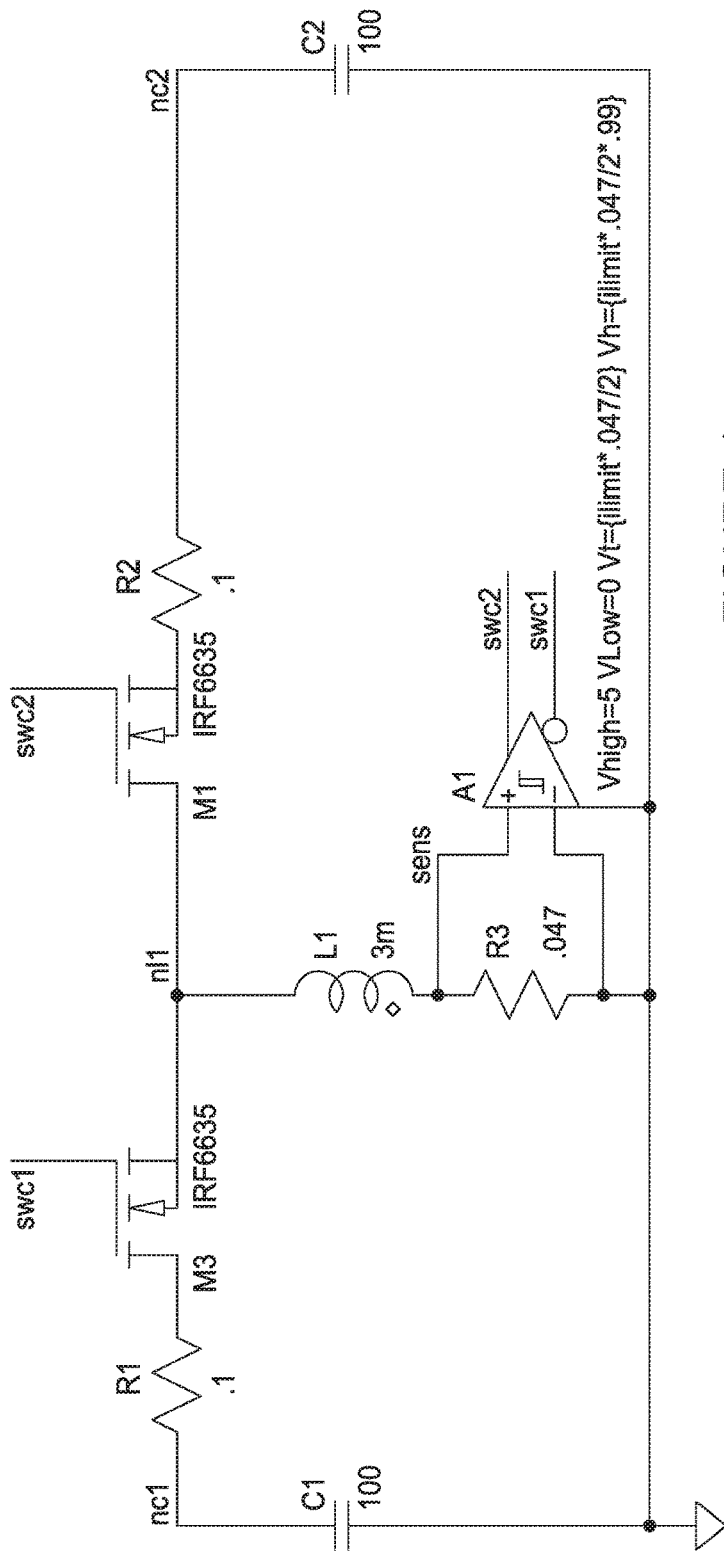

The conventional means of performing this transfer is by using a buck boost converter. Such a circuit is shown in FIG. 1. In this circuit capacitor C1 acts as the first electrode (i.e., electrode 1) during the desalination operation to store charge as salt water moves between its plates and ions are removed from the water. This results in the buildup of a charge on electrode 1 (C1). When electrode 1 (C1) is fully charged, the circuit then begins to transfer energy from electrode 1 (C1) to an inductor (L1), and then from the inductor to a second electrode (i.e., electrode 2, labelled as C2). This transfer is done in two steps, and current passes through each electrode only half the time. Electrode 1 (C1) discharges when switch 1 (swc1) is closed (conducting) and switch 2 (swc2) is open. Current flows into the inductor (L1) and the inductor begins storing the energy from electrode 1 (C1) in its magnetic field. When the current through the inductor (L1) reaches a predetermined maximum, then switch 1 is opened and switch 2 is closed. At this point the inductor (L1) begins transferring its magnetic field charge energy through switch 2 to electrode 2 (C2). When the current flow in the inductor (L1) reaches a predetermined minimum, switch 2 is opened and switch 1 is closed, and the above cycle repeats itself. It typically takes numerous cycles to transfer all of the energy from electrode 1 (C1) to electrode 2 (C2). As such, each one of the electrodes 1 and 2 is only charging or discharging one half the time during any given charging or discharging cycle. This means that it takes twice as long to fully charge an electrode than it would if the charging process was continuous at the same average current. It also means that it takes twice as long to fully discharge one of the electrodes than it would if the discharging process was continuous. One method to speed up the transfer of charge from electrode 1 to the inductor, and then from the inductor to electrode 2, is to allow a greater current flow during the charge transfer process. Thus, using a higher current flow will improve the throughput of the system, but increasing the magnitude of current flow will also increase the power dissipation losses due to the internal resistances of the electrodes and the cables. Accordingly, simply increasing the current flow to reduce the time needed to complete the regeneration step is not a preferred option. It should also be noted that, under the current configuration of the circuit, half the capacitor material will be desalinating water at any given time, whereas the rest is regenerating, which means that half of the material is not contributing to the desalination operation under this configuration.

From the above it will be appreciated that limitations and tradeoffs exist in speeding up the transfer of charge from one capacitor to another. Since the desalination step cannot be initiated until the regeneration step is completed, any feature or improvement that reduces the time needed to perform the regeneration step (i.e., remove the stored charge from the capacitor that performs the desalination step) to another electrode, would improve the throughput of the system and thus its economic performance as well.

SUMMARY

This section provides a general summary of the disclosure, and is not a comprehensive disclosure of its full scope or all of its features.

In one aspect the present disclosure relates to an energy transfer system comprising a controller, a first capacitor acting as a first electrode, a second capacitor acting as a second electrode, and a first inductor for storing energy received from the first capacitor, and transferring the stored energy to the second capacitor. A first plurality of switches may also be included which are used to control a transfer of energy from the first capacitor to the first inductor, and from the first inductor to the second capacitor. An additional energy transfer subsystem may be included which has a second plurality of electronic switches controlled by the controller, a second inductor for receiving energy from the first capacitor, and a third capacitor for receiving energy from the second inductor. The second plurality of electronic switches may be controlled by the controller to simultaneously charge the second inductor while the first inductor is charging, and to simultaneously transfer energy from the second inductor to the third capacitor while energy is being transferred from the first inductor to the second capacitor.

In another aspect the present disclosure relates to an energy transfer system. The system may include a controller and a first energy transfer subsystem. The first energy transfer subsystem may include a first capacitor acting as a first electrode, a second capacitor acting as a second electrode, a first inductor for storing energy received from the first capacitor, and transferring the stored energy to the second capacitor. First and second electronic switches may be included which are controlled by the controller to transfer energy from the first capacitor to the first inductor, and from the first inductor to the second capacitor. A second energy transfer subsystem may be included which has a second inductor, a third capacitor, and third and fourth electronic switches controlled by the controller for transferring energy from the first capacitor to the second inductor, and from the second inductor to the third capacitor. A third energy transfer subsystem may be included which has a third inductor, a fourth capacitor, and fifth and sixth electronic switches controlled by the controller for transferring energy from the first capacitor to the third inductor, and from the third inductor to the fourth capacitor. The electronic switches may be controlled so that the first, second and third inductors all receive energy from the first capacitor simultaneously, and the first, second and third inductors all transfer energy simultaneously to the second, third and fourth capacitors.

In still another aspect the present disclosure relates to a method for performing energy transfer which helps to remove ions from a flowing fluid containing the ions. The method may comprise using a first capacitor to form a first electrode for use in removing ions from a fluid containing the ions flowing through the first electrode. The method may further involve using an inductor to receive energy from the first capacitor during a regeneration stage of operation, and also using a switching network of electronic switches controlled by a controller to control a transfer of charge from the inductor during the regeneration stage of operation. The method may further involve using the controller to control the electronic switches to enable a simultaneous transfer of the charge from the inductor to each one of the plurality of additional capacitors during the regeneration stage of operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
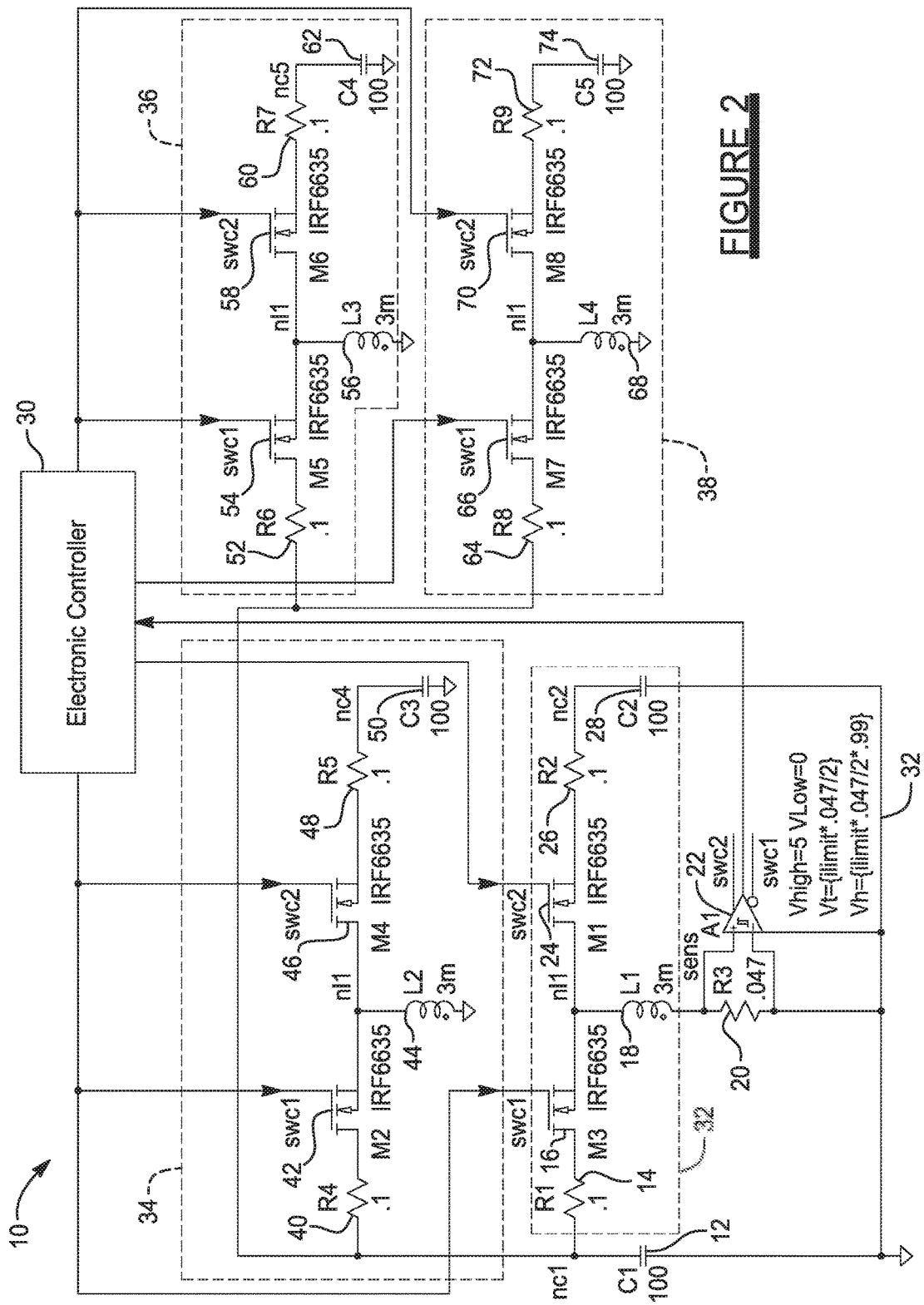
Figure 3:
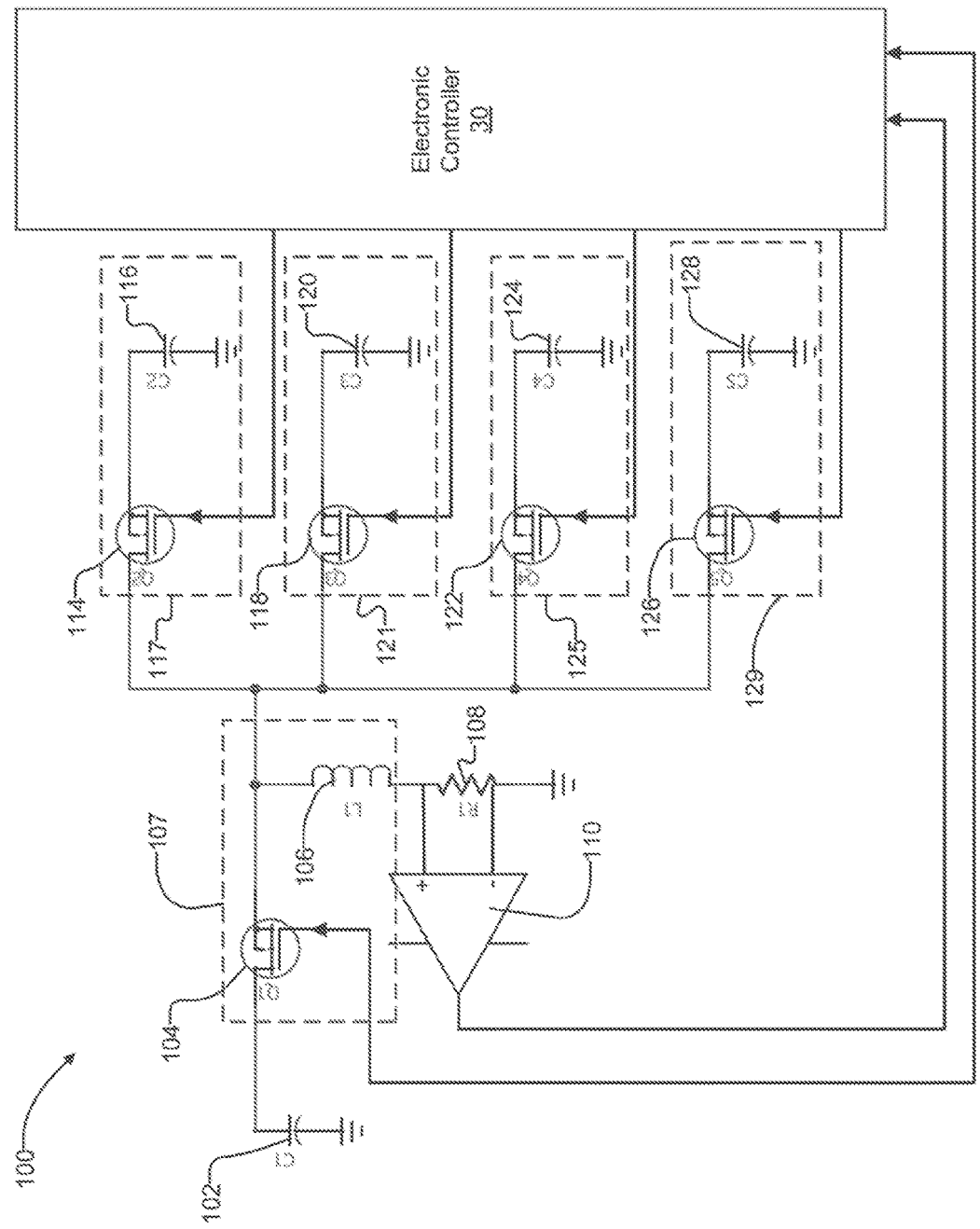

FIG. 1 is a schematic drawing of a prior art electronic circuit for performing energy transfer, and more particularly capacitive desalination, which makes use of one electrode (capacitor C1) for performing the desalination step, along with an inductor and a second capacitor (capacitor C2) for performing the regeneration operation;

FIG. 2 is a schematic drawing of one embodiment of a system for performing energy transfer in which the system makes use of four distinct stages of inductors and capacitors to significantly reduce the time needed to perform the regeneration step; and FIG. 3 is a high level schematic diagram of another embodiment of an energy transfer system of the present disclosure which forms an "any to any" charge transfer system.

Corresponding reference numerals indicate corresponding parts throughout the several views of the drawings.

DETAILED DESCRIPTION

Example embodiments will now be described more fully with reference to the accompanying drawings.

The conventional means of transferring stored energy from an electrode of a capacitive desalination system is by transferring charge from the electrode performing the regeneration operation to an electrode that performs the desalination operation. The present system and method, however, transfers charge from the regenerating electrode simultaneously to a plurality of electrodes in a corresponding plurality of desalination stages. Each desalination stage has an electronic switching component and an inductor. The timing of the electronic switching component of each stage is controlled by an electronic controller to optimize the transfer rate of energy from the regenerating electrode to the desalination electrodes. The use of a plurality of stages to simultaneously receive energy from a first electrode of the system, wherein each stage has its own inductor and capacitor, enables charging multiple electrodes while regenerating an electrode, compared to only one electrode with the current system. Thus, instead of having half of the material not contributing at a given time, the fraction drops to a third (for transferring from one to two electrodes) or a quarter (for transferring from one to three electrodes), and proportionally reduces the amount of electrode material that has to be used to sustain a given throughput rate.

Referring to FIG. 2, one embodiment of an energy transfer system, and more particularly a capacitive desalination system 10, in accordance with the present disclosure is shown. The system 10 in this example includes a first capacitor (C1) 12 which forms a first electrode, a first resistor 14 representing the internal resistance of the first capacitor 12, a first electronic switch 16 which in this example is a FET, a first inductor (L1) 18, a current sensing resistor 20, a comparator circuit 22 having its inputs coupled across the current sensing resistor 20, a second electronic switch 24 formed by a FET, a second resistor 26 representing the resistance of the second electronic switch 24, and a second capacitor (C2) 28 which forms a second electrode. The comparator circuit 22 generates an output which is received by an electronic controller 30, which may be, for example, a microcontroller. The electronic controller 30 controls the switching of the first and second electronic switches 16 and 24 to implement the desalination and regeneration operations. The components 14, 16, 18, 24, 26 and 28 collectively represent a first desalination stage 32. The first desalination stage 32 operates as described above for the circuit of FIG. 1.

The system 10 provides a significant advance over the circuit of FIG. 1 by providing a plurality of additional energy transfer subsystems that each form a separate desalination stage that are operated concurrently (i.e., simultaneously) with the first desalination stage 32. In the example embodiment shown in FIG. 2, second, third and fourth energy transfer subsystems 34, 36 and 38, respectively, act as second, third and fourth desalination stages which help to significantly expedite performing the desalinating operation. Second energy transfer subsystem 34 includes a resistor 40 representing the resistance of the cabling, a third electronic switch 42 in the form of a FET, a second inductor (L2) 44, a fourth electronic switch 46 in the form of a FET, a resistor 48 and a third capacitor (C3) 50. The third capacitor 50 represents a third electrode and the resistor 48 represents the resistance of the third capacitor. The third and fourth electronic switches 42 and 46 are in communication with the electronic controller 30 and switched on and off in a controlled fashion by the electronic controller.

Third energy transfer subsystem 36 is similar in construction to the second energy transfer subsystem 34 and includes a resistor 52 which represents the internal resistance of the cabling, a fifth electronic switch 54 which in this example is a FET, a third inductor (L3) 56, a sixth electronic switch 58, a resistor 60 and a fourth capacitor (C4) 62. The fourth capacitor 62 represents a fourth electrode. The resistor 60 represents the resistance of the fourth capacitor 62. The fifth and sixth electronic switches 54 and 58 are both in communication with the electronic controller 30 and switched on and off by the electronic controller in a controlled fashion.

Fourth energy transfer subsystem 38 includes a resistor 64 representing an internal resistance associated with cabling, a seventh electronic switch 66, a fourth inductor (L4) 68, an eighth electronic switch 70 which in this example is a FET, a resistor 72 and a fifth capacitor 74. The fifth capacitor 74 represents a fifth electrode and the resistor 72 represents the internal resistance of the fifth capacitor. The seventh and eighth electronic switches 66 and 70, respectively, are switched on and off in a controlled fashion by the electronic controller 30. And while the electronic switches 16, 24, 42, 46, 54, 58, 66 and 70 have been described as FETs, and will be referenced in the following description of operation for convenience simply as "FETs", it will be appreciated that any suitable electronically controllable switching element may potentially be used, and thus the system 10 is not limited to use with only FETs as the electronic switching elements.

In operation, the system 10 operates so that the timing of the first FET 16, the third FET 42, the fifth FET 54 and the seventh FET 66 are all turned on (i.e., conducting) at the same time at the start of a desalination operation. The second FET 26, the fourth FET 48, the sixth FET 58 and the eighth FET 70 will all be turned off (i.e., non-conducting) at the start of the desalination operation.

The first inductor 18 (L1), second inductor 44 (L2), third inductor 56 (L3) and the fourth inductor 68 (L4) will all begin charging simultaneously as they receive the energy stored by the first capacitor 12 (C1). Each of the inductors 18, 44, 56 and 68 will receive about 0.25% of the flow from the first capacitor 12 (C1). The electronic controller 30 monitors the current flow through the inductor 18 via the sensed voltage drop across resistor 20 (R3), and when the current flow reaches a predetermined maximum level, it turns off the first FET 16, the third FET 42, the fifth FET 54 and the seventh FET 66, and then turns on the second FET 24, the fourth FET 46, the sixth FET 58 and the eighth FET 70. This enables current to current to begin flowing through the FETS 24, 46, 58 and 70 into the capacitors 28, 50, 62 and 74. Thus, the charging of all of the capacitors 28, 50, 62 and 74 begins simultaneously. When the electronic controller 30 detects a minimum current flow via a minimum voltage drop across second resistor 20 (R3), then it again turns on FETs 16, 42, 54 and 66, and turns off FETs 24, 46, 58 and 70, and the process of re-charging the inductors 18, 44, 56 and 68 begins again.

Thus, the switching action of the FETs 16, 24, 42, 46, 54, 58, 66 and 70 is controlled so that FETs 16, 42, 54 and 66 are always on while FETs 24, 46, 58 and 70 are always off, and vice versa. The potential drawback with an excessive power loss because of the increased current flow out from first capacitor 12 (C1) is avoided because the resistance of first resistor 14 (R1, the internal resistance of the electrode represented by capacitor 12 (C1)) decreases as the first capacitor 12 (C1) discharges, because salt is released from the electrode surface into the pores in the liquid during the discharge, increasing local ion concentration and reducing the resistance. With reference to FIG. 3, an energy transfer system is shown which forms a capacitive desalination system 100 in accordance with another embodiment of the present disclosure. The system 100 also makes use of a first capacitor 102 (C1), a first electronic switch 104 (Q1) which in this example is an FET, an inductor 106 (L1), a current sensing resistor 108 (R1), an operational amplifier configured as a comparator 110 having an output fed to the controller 30, a second electronic switch 114 (Q2) which in this example is a FET, a second capacitor 116, a third electronic switch 118 (Q3) which in this example is a FET, a third capacitor 120 (C3), a fourth electronic switch 122 (Q4) which in this example is a FET, a fourth capacitor 124 (C4), a fifth electronic switch 126 (Q5) which in this example is a FET, and a fifth capacitor 128 (C5). The first FET 104 and the first inductor 106 form a first energy transfer subsystem 107, the second FET 114 and the second capacitor 116 (C2) form a second energy transfer subsystem 117, the third FET 118 and the third capacitor 120 (C3) form a third energy transfer subsystem 121, the fourth FET 122 and the fourth capacitor 124 form a fourth energy transfer subsystem 125, and the fifth FET 126 and the fifth capacitor 128 form a fifth energy transfer subsystem 129. The energy transfer subsystems 107, 117, 121,125 and 129 each form portions of a desalination stage or subsystem for carrying out a desalination step of operation. The gate of each of the FETs 104, 114, 118, 122 and 126 has its gate in communication with the controller 30 and can be switched on and off by the controller.

In operation, when the first capacitor 102 needs to be discharged, the controller 30 turns on the first FET 104 and the first capacitor begins transferring its energy the inductor 106. When the comparator 110 detects that a maximum predetermined current is flowing through the inductor 106 via the voltage drop across the current sensing resistor 108, the comparator generates an output signal to the controller 30. The controller 30 turns off the first FET 104 and turns on FETs 114, 118, 122 and 128. Capacitors 116, 120, 124 and 128 will simultaneously begin receiving the stored energy from the inductor 106. Once the output from the comparator 110 indicates that the current through the inductor 106 has dropped to a predetermined minimum value, then the controller 30 turns off the FETs 114, 118, 122 and 126 and again turns on the first FET 104 to again start charging the inductor 106. This process is repeated typically a plurality of times until the voltage across the first capacitor 102 is reduced to a predetermined minimum value, for example 0.2V, and then the desalination operation can be repeated to re-charge the first capacitor 102 (C1). Allowing the first capacitor to regenerate involves the controller turning off the first FET 104 for a predetermined time interval.

The above described system 100 allows essentially an "any to any" charge transfer to be accomplished. Another charging sequence that could be implemented using the system 100, and which may even further increase the efficiency of the system, may involve always starting the charge transfer from the inductor 106 to the capacitor (i.e., one of capacitors 114, 118, 122 or 126) that has the highest voltage, but is lower than the voltage of the first capacitor 102 (C1). The system 100 works best in the buck mode, so by starting to transfer energy to the capacitor that happens to be at the highest voltage, and working sequentially down to other ones of the capacitors as the voltages of the capacitors (116, 120, 124 and 128) become equal, the system 100 will be transferring energy in the buck mode more of the time. So for example, if the first capacitor 102 (C1) initially had a voltage of 1.0V, and at a given time the second capacitor 116 (C2) had a voltage of 0.8V, the third capacitor 120 (C3) had a voltage of 0.6V, the fourth capacitor 124 (C4) had a voltage of 0.4V, and the fifth capacitor 128 (C5) had a voltage of 0.2V, then the second FET 114 would be turned on initially when the first FET 104 is turned off. As soon as the second capacitor 116 (C2) is charged to a predetermined maximum value, then the second FET 114 would be turned off and the third FET 118 turned on to begin charging the third capacitor 120 (C3). As soon as the third capacitor 120 (C3) is fully charged then the third FET 118 would be turned off and the fourth FET 122 would be turned on to begin charging the fourth capacitor 124 (C4)/, and so forth.

It will also be appreciated that while four capacitors 116, 120, 124 and 128 are shown being used in the system 100, that a greater or lesser plurality of capacitors could be incorporated instead, and that the system 100 is therefore not limited to use with only four capacitors in the desalination portion of the system. Further, the final circuit may include additional current sensing resistors to better control and optimize the process. The various described embodiments all enable a capacitive desalination system to be provided which enables a significantly faster transfer of charge from one electrode to one or more other electrodes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An energy transfer system comprising:
   a controller;
   a first capacitor acting as a first electrode for the energy transfer system;
   a second capacitor acting as a second electrode for the energy transfer system;
   a first inductor for storing energy received from the first capacitor, and transferring the stored energy to the second capacitor;
   a first plurality of electronic switches controlled by the controller for controlling a transfer of energy from the first capacitor to the first inductor and from the first inductor to the second capacitor; and
   an additional energy transfer subsystem including:
      a second plurality of electronic switches controlled by the controller;
      a second inductor for receiving energy from the first capacitor; and
      a third capacitor for receiving energy from the second inductor;
      the controller configured to control at least a first switch from each of the first plurality of electronic switches and the second plurality of electronic switches to simultaneously charge the second inductor while the first inductor is charging, thus splitting energy received from the first capacitor between the first and second inductors, and at least a second switch from each one of the first and second pluralities of switches being controlled by the controller to simultaneously transfer energy from the second inductor to the third capacitor while energy is being transferred from the first inductor to the second capacitor.

2. The system of claim 1, further comprising another energy transfer subsystem having a third plurality of electronic switches, a third inductor and a fourth capacitor, the third plurality of electronic switches being controlled by the controller to charge the third inductor simultaneously with charging of the first and second inductors, and to transfer energy from the third inductor to the fourth capacitor simultaneously with the transfer of energy from the first inductor to the second capacitor.

3. The system of claim 2, further comprising a final energy transfer subsystem having a fourth plurality of electronic switches, a fourth inductor and a fifth capacitor, and wherein the controller controls the fourth plurality of electronic switches so that energy is transferred from the first capacitor to the fourth inductor simultaneously while energy is being transferred from the first capacitor to the first inductor, and further such that energy is transferred from the fourth inductor to the fifth capacitor simultaneously while energy is being transferred from the first inductor to the second capacitor.

4. The system of claim 3, wherein:
the first plurality of electronic switches, the first inductor and the second capacitor form a first regeneration stage;
the additional energy transfer subsystem forms a second regeneration stage; and
the another energy transfer subsystem forms a third regeneration stage; and;
the final energy transfer subsystem forms a fourth regeneration stage.

5. The system of claim 1, wherein the system forms at least one of:
a desalination system for removing salt from salt water; or
a deionization system for removing ions from an fluid containing the ions.

6. The system of claim 1, wherein the first plurality of electronic switches comprises a pair of first field effect transistors (FETs), and wherein the second plurality of electronic switches comprises a second pair of field effect transistors.

7. The system of claim 1, wherein the system further includes a current sensing resistor and a comparator circuit coupled across the current sensing resistor for monitoring a magnitude of a current flow through the first inductor, and wherein an output of the comparator is coupled to the controller.

8. The system of claim 1, wherein the first plurality of electronic switches comprise first and second field effect transistors (FETs), and wherein the second plurality of electronic switches comprises third and fourth FETs.

9. The system of claim 2, wherein the third plurality of electronic switches comprises fifth and sixth field effect transistors (FETs).

10. The system of claim 3, wherein the fourth plurality of electronic switches comprises seventh and eighth field effect transistors (FETs).

11. An energy transfer system comprising:
a controller;
a first energy transfer subsystem having:
a first capacitor acting as a first electrode for the enemy transfer system;
a second capacitor acting as a second electrode for the enemy transfer system;
a first inductor for storing energy received from the first capacitor, and transferring the stored energy to the second capacitor;
first and second electronic switches controlled by the controller for controlling a transfer of energy from the first capacitor to the first inductor, and from the first inductor to the second capacitor;
a second energy transfer subsystem including:
a second inductor;
a third capacitor;
third and fourth electronic switches controlled by the controller for transferring energy from the first capacitor to the second inductor, and from the second inductor to the third capacitor;
a third energy transfer subsystem including:
a third inductor;
a fourth capacitor;
fifth and sixth electronic switches controlled by the controller for transferring energy from the first capacitor to the third inductor, and from the third inductor to the fourth capacitor; and
the controller configured to control the electronic switches so that the first, third and fifth electronic switches are simultaneously turned on only while the second, fourth and sixth electronic switches are turned off so that the first, second and third inductors all receive energy from the first capacitor simultaneously and charge simultaneously, and
the controller further being configured to control the electronic switches so that the second, fourth and sixth electronic switches are simultaneously turned on only while the first, third and fifth electronic switches are turned off such that the first, second and third inductors all transfer energy simultaneously to the second, third and fourth capacitors, while enabling the first capacitor to simultaneously charge.

12. The system of claim 11, further comprising:
a current sensing resistor configured in series with the first inductor for sensing a current flow through the first inductor; and
a comparator circuit in communication with the current sensing resistor for detecting a voltage drop across the current sensing resistor, an output of the comparator being received by the controller.

13. The system of claim 11, wherein each of the first, second, third, fourth, fifth and sixth electronic switches comprise a field effect transistor (FET).

* * * * *